Jan. 21, 1941.  W. R. LUSTIG  2,229,513
LID SUPPORT
Filed June 24, 1938  2 Sheets-Sheet 1
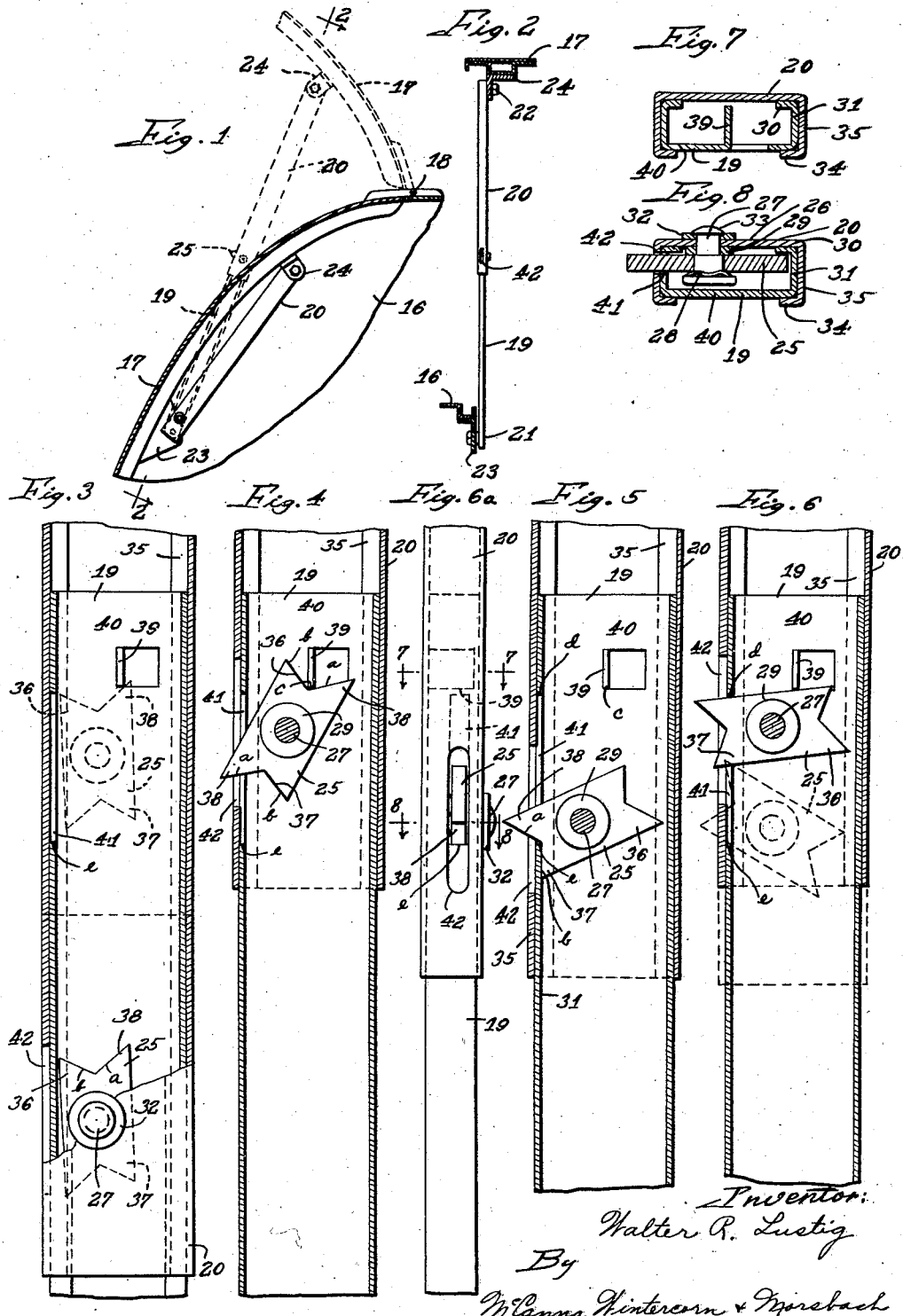

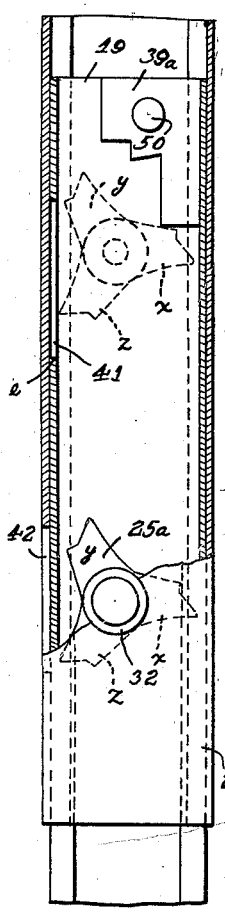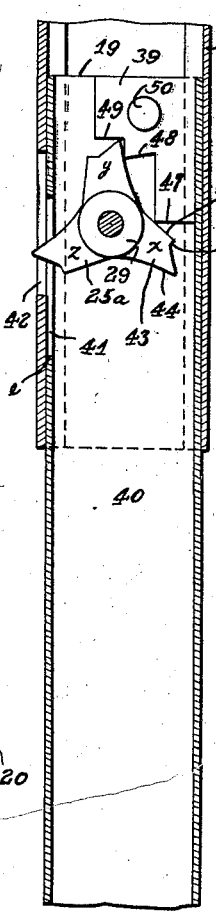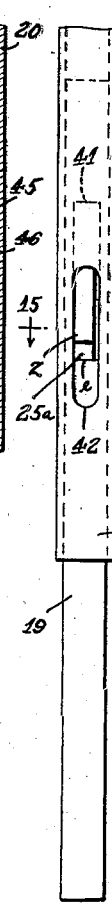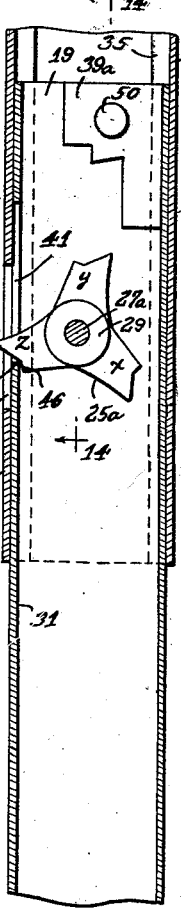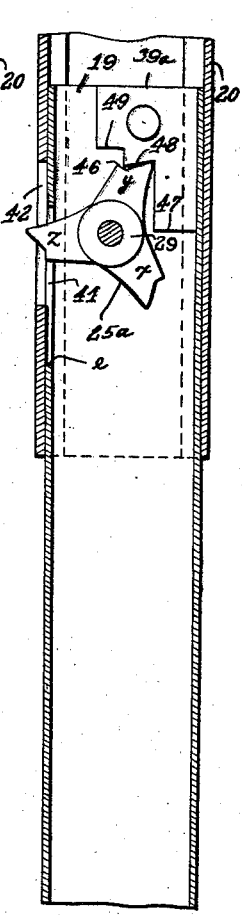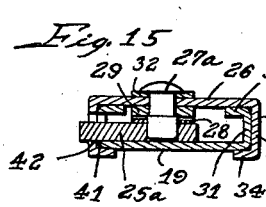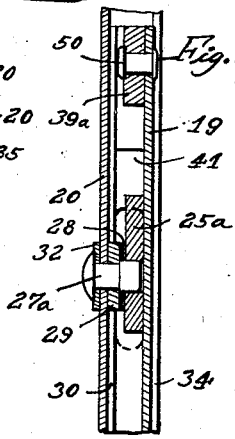

Patented Jan. 21, 1941

2,229,513

UNITED STATES PATENT OFFICE 2,229,513

LID SUPPORT

Walter R. Lustig, Rockford, Ill., assignor to The Atwood Vacuum Machine Company, Rockford, Ill., a co-partnership composed of Seth B. Atwood and James T. Atwood Application June 24, 1938, Serial No. 215,545

10 Claims. (Cl. 217—60)

This invention relates to supports for liftable hinged closures, and has particular reference to a new and improved support for the lid of a luggage compartment on an automobile or other vehicle.

In my earlier applications Serial Nos. 148,829 and 186,537, I disclosed a pawl and ratchet escapement mechanism as applied to a folding type lid support. It is the principal object of my present invention to provide a telescoping type lid support embodying a similar pawl and ratchet escapement mechanism, inasmuch as there are certain advantages in the use of the telescoping type over the folding type.

The invention is illustrated in the accompanying drawings, in which—

Fig. 1 is a side view of the rear portion of an automobile, showing a support made in accordance with my invention;

Fig. 2 is a rear view of the support in extended lid supporting position, showing related portions of the lid and body in section on the line 2—2 of Fig. 1;

Figs. 3 to 6 are longitudinal sectional views of the telescoping lid support members in different positions throughout a cycle of operation, so as to illustrate the action of the pawl and ratchet escapement mechanism;

Fig. 6a is a side view of Fig. 5;

Figs. 7 and 8 are sections on the correspondingly numbered lines of Fig. 6a;

Figs. 9 to 12 are longitudinal sections similar to Figs. 3 to 6, showing a modified or alternative construction;

Fig. 13 is a rear view of Fig. 11;

Fig. 14 is a longitudinal sectional detail on the broken line 14—14 of Fig. 11, and Fig. 15 is a cross-section on the line 15—15 of Fig. 13.

Similar reference numerals are applied to corresponding parts throughout the views.

Referring first mainly to Figs. 1 and 2, the reference numeral 16 designates the luggage compartment of an automobile and 17 its lid or door hinged at 18 to permit raising and lowering the lid. The lid support of my invention comprises two telescoping supporting arms 19 and 20 pivotally attached at 21 and 22, respectively, to the side wall of the luggage compartment 16 and edge portion of the lid 17, as shown. Brackets 23 and 24 suitably secured to the body and lid provide the pivot supports. The two arms 19 and 20 are formed from sheet metal bent to channel-shaped cross-section, and the two arms are disposed in telescoping relation with the channels opening toward one another, as clearly appears in Figs. 7 and 8. A two-toothed pawl 25 is rotatably mounted on the web 26 of the arm 20 on a stud 27. A spring washer 28 (Fig. 8) under the head of the stud 27 imposes sufficient frictional drag upon the rotation of the pawl 25 to insure it staying in one position until forcibly moved to another. A washer 29 serves as a spacer to keep the pawl 25 spaced far enough from the web 26 to avoid rubbing on the inturned longitudinal flanges 30 on the side walls 31 of the arm 19, and still another washer 32 is provided under the upset end 33 of the stud 27 to insure good support for the stud on the arm 20. The arm 20 also has inturned flanges 34 on the side walls 35 thereof which serve not only to reinforce the arm, but also to retain the arm 19 in telescoping relation therewith, as clearly appears in Figs. 7 and 8. Now, the pawl 25 is of generally rectangular form with the opposite ends thereof notched out to provide V-shaped teeth 36 and 37. These teeth are not quite symmetrical, one prong 38 of each being slightly longer than the other prong. The surface a and b on these V-shaped teeth are adapted to have slidable engagement with ratchet abutments provided therefor on the arm 19 in the reciprocation of the pawl 25 with the arm 20 relative to the arm 19 in the manner illustrated in Figs. 3 to 6, whereby to limit extension of the telescoping arms and accordingly limit the raising of the lid 17, and thereafter limit return movement so as to support the lid in raised position, and finally thereafter again limit extension of the arms as the lid is subsequently raised again, preliminary to lowering or dropping the lid to its closed position. The ratchet abutments referred to are provided by a lug 39 struck inwardly from the web 40 of the arm 19, and an elongated longitudinal slot 41 provided in one of the side walls 31, the lug 39 providing one abutment or shoulder c, and the slot 41 providing opposed abutments or shoulders d and e for slidable engagement with the surfaces a on the teeth 36 and 37 of the pawl 25. Another elongated longitudinal slot 42 in the side wall 35 of the other arm 20 moves into and out of register with the slot 41 and serves merely to provide operating clearance for whichever prong 38 on the pawl happens to be caused to project when the arms of the lid support are extended to lid supporting position.

In operation, at the start of a cycle when the lid 17 is being raised, the arms 19 and 20 are in the position shown in Fig. 3 with the pawl 25 in the full line position, spaced from the lug 39. The pawl encounters the lug 39, as shown in dotted lines in Fig. 3, when the lid is raised nearly as far as it will go, and, as the lid is raised further, the pawl is turned through about 30° in a clockwise direction to the position shown in Fig. 4, by sliding engagement of the surface $a$ on prong 38 with the bottom surface $c$ on the lug 39. The lid cannot be raised any farther when the pawl is in the position shown in Fig. 4. The operator soon becomes accustomed to raising the lid as far as it will go, so that there is no question about the positive operation of the lid support. It will be noticed in Fig. 4 that the pawl in turning has projected the prong 38 of its other tooth 37 through the slots 41 and 42. The moment therefore that the lid is released at the limit of its upward movement and the arm 20 moves downwardly relative to the arm 19, as shown in Fig. 5, the surface $a$ on the prong 38 has sliding engagement with the shoulder $e$ at the lower end of the slot 41 in the arm 19, and causes the pawl 25 to turn through approximately 40° in a clockwise direction from the position of Fig. 4 to that of Fig. 5, the pawl stopping when the surface $b$ on the other prong of the tooth 37 comes into abutment with the inner side of the side wall 31 of the arm 19. This positively limits downward movement of the arm 20, and the lid 17 is therefore supported in raised position, substantially as illustrated in dotted lines in Fig. 1. The fact that the weight of the lid 17 is acting against the pawl 25, tending to turn it farther in a clockwise direction, sets up a binding action between the arms 19 and 20 as a side wall 31 of the arm 19 is crowded against the side wall 35 of the arm 20 by the tooth 37 of the pawl 25. In other words, the arms are actually clamped in their lid supporting relationship, thus affording a very firm support. This clamping makes it unlikely that the effect of wind pressure against the lid will be apt to raise the lid from the position illustrated in Figs. 1 and 5. However, even if that should occur, or if the operator should brush against the lid and cause it to rise slightly, there is no danger of the lid dropping and causing damage or injury, because the spring washer 28 holds the pawl 25 in the position shown in Fig. 5 until it is forcibly turned to another position, as by engagement with the lug 39, as illustrated in Fig. 6, when the lid is raised as far as it will go, preparatory to closing it. In other words, there is no "hair trigger" action with this lid support as with the old style over-center type, where slight movement of the lid was apt to cause the middle pivot of two pivotally connected arms to move to or past dead-center and thus allow the lid to drop. When the lid is to be closed, the operator simply raises it as far as it will go, and in this operation the pawl 25 first encounters the lug 39 and is turned in a clockwise direction through about 20° to the position shown in Fig. 6, the movement being limited by the engagement of the other end of the pawl with the shoulder $d$ at the upper end of the slot 41 in the arm 19. This positively limits the upward movement of the lid. Then the lid can be lowered or dropped to closed position, and, as indicated in dotted lines in Fig. 6, the pawl 25 in the first part of the downward movement of the arm 20 strikes the other end $e$ of the slot 41 and is turned in a clockwise direction through approximately 90° toward the position shown in full lines in Fig. 3, which is the starting position for the cycle of operation. In the next cycle, the tooth 37 is presented for engagement with the lug 39 to start the series of intermittent indexing movements of the pawl previously described. The pawl 25, in other words, moves through approximately 180° in each cycle of operation, the tooth 36 being used in one cycle and the tooth 37 in the next, and so on.

The present lid support has an important advantage over other lid supports in having the pawl and ratchet escapement mechanism substantially completely enclosed in the telescoping arms 19 and 20, so that nothing can come in contact with the parts thereof and be damaged thereby or cause damage to the lid support and possibly interfere with the operation thereof. The only time any part of the escapement mechanism is exposed is when one of the prongs 38 projects through the slot 42, as shown in Figs. 4, 5 and 6, but that is only when the device is in lid supporting position or when the pawl 25 is moving into or out of such position, and there is, of course, no danger whatever of the pawl coming in contact with anything in the luggage compartment at those times.

The lid support illustrated in Figs. 9 to 15 is quite similar to the one just described, the principal difference being the provision of a three-toothed pawl 25a instead of the two-toothed pawl 25 and a three-stepped abutment block 39a instead of the abutment lug 39. Each tooth 43 of the pawl is of generally triangular form with one side 44 substantially straight and the other side 45 formed with a step or shoulder 46. The block 39a has three steps 47, 48 and 49 and is riveted or otherwise suitably secured in place on the web 40 of the arm 19, as indicated at 50. The arm 19 has a slot 41 in the side wall 31 similarly as in the other construction, and the arm 20 has a slot 42 in the side wall 35 thereof, which, similarly as in the other construction, merely provides clearance for the rotation of the pawl. The pawl 25a is carried on a stud 27a on the web 26 of the arm 20. The two arms 19 and 20 are telescoped in the same way as in the other construction and are retained in such relationship by the inturned flanges 34 on the side walls 35 of the arm 20.

In operation, the principal difference in the operation of the present support is that the pawl 25a is turned through 120°—namely, a third of a revolution—instead of 180°, a half revolution, due to the fact that there are three teeth on the pawl 25a as compared with two on the pawl 25. Briefly stated, the pawl at the commencement of the cycle is in the full line position of Fig. 9 and in the upward travel of the arm 20 in the raising of the lid the pawl first encounters the step 47 with its tooth $x$, as indicated in dotted lines in Fig. 9, and is turned in a clockwise direction through about 30° to the position shown in Fig. 10, which is the position in which the pawl positively limits further upward movement of the lid. It will be noted that in this position the tooth $x$ has its stepped side engaging the step 47 on the block 39a and the straight side of the next tooth $y$ engaging the front of the step 48. When the lid is then released or lowered, the third tooth $z$ which is then projecting through the slots 41 and 42, as shown in Fig. 10, limits downward movement of the arm 20 when the stepped side of the tooth $z$, after turning the pawl 25a through another 30°, approximately, comes to rest against the shoulder $e$ at the lower end of the slot 41 with its shoulder 46 preventing further rotation of the pawl by engaging with the inner side of the side wall 31 of the arm 19. In this position of the pawl, similarly as in the other construction, the arm 19 is forced to the left, as viewed in Fig. 11, while the arm 20 is forced to the right, thus bringing the side walls 31 and 35 along one side of the arms of the lid support into tight frictional engagement, so that the support is extremely rigid. The full weight of the lid and the arm 20 are active upon the pawl 25a tending to turn it in a clockwise direction from the position of Fig. 11, thereby insuring this desired binding action. The lid is therefore supported just as positively as with the other construction, although I prefer the first construction because of the greater width of the surface b presented for engagement with the side wall 31 as compared with the narrower shoulder 46 in the present construction. When the lid is to be lowered, the operator simply raises it as far as it will go, and at the limit of the upward movement, the tooth y slidably engages the inclined lower face of the step 48, causing the pawl 25a to turn through approximately 10°, to the position shown in Fig. 12, when the shoulder 46 limits further movement, and further raising of the lid is prevented. Then the lid can be lowered or released and allowed to drop to closed position, and in this movement of the arm 20, the tooth z striking the lower end e of the slot 41 will turn the pawl 25a in a clockwise direction through another 50°, or thereabouts, sufficient to bring it to the starting position illustrated in full lines in Fig. 9, the tooth z in that case occupying the position of the tooth y illustrated in Fig. 9. The pawl is then ready for the commencement of the next cycle.

It is believed the foregoing description conveys a good understanding of the objects and advantages of my invention. The appended claims are drawn with a view to covering all legitimate modifications and adaptations.

I claim:

1. A device of the character described, comprising an arm pivotally attached to a lid or other hinged member, another arm in telescoping relation with the first arm and pivotally attached to a receptacle or other support on which the lid is hinged, a pawl rotatably mounted on a transverse axis on one of said arms having two teeth in diametrically opposed relationship, the other arm having a longitudinally extending slot the opposite ends of which constitute abutments for engagement with either tooth of the pawl in the reciprocation of the arms relative to one another, and a third abutment on said other arm in laterally spaced relation to one end of the slot therein and disposed on the opposite side of the axis of rotation of said pawl for engagement with the other tooth of the pawl, the teeth of the pawl being V-shaped with the apexes of the V's projecting toward one another on diametrically opposite sides of the axis of rotation of the pawl.

2. A device of the character described, comprising two sheet metal telescoping members of channel cross-section adapted to be reciprocated relative to one another, one of said members being pivotally attached by its web portion to a lid or other hinged element and the other member being pivotally attached by its web portion to a receptacle or other support on which the lid is hinged, a pawl rotatably mounted on a transverse axis on the web portion of the outer member having at least two teeth in equally circumferentially spaced relationship about its axis of rotation, the teeth of the pawl each having a V-shaped recess and the apexes of the V's projecting toward one another, thereby defining two prongs for each tooth, said members having two longitudinally extending slots provided in the corresponding side walls thereof arranged to come into register in the reciprocation of said members relative to one another, the slot in the side wall of the outer member being disposed in juxtaposition to the pawl so that one tooth of the latter is free to project through the same when the slot in the side wall of the inner member is in registration therewith, the slotted side wall of said inner member being spaced from the axis of rotation of the pawl a distance slightly less than the radius of a tooth of said pawl and adapted to have a tooth of said pawl engage in one end of said slot when supporting the lid in open position, whereby the pawl flexes the sheet metal of said slotted side wall enough to cause a binding frictional engagement thereof with the adjacent wall of the other arm during the lid supporting operation, and an abutment on the inner member in laterally spaced relation to one end of the slot therein and disposed on the opposite side of the axis of rotation of said pawl for engagement with another tooth of the pawl.

3. A device as set forth in claim 1, wherein one prong of one tooth of the pawl is longer than the other prong, and the corresponding prong on the other tooth is correspondingly longer than its companion prong.

4. A device of the character described, comprising an arm pivotally attached to a lid or other hinged member, another arm in telescoping relation with the first arm and pivotally attached to a receptacle or other support on which the lid is hinged, a pawl rotatably mounted on one of said arms and having at least two teeth in equally circumferentially spaced relation with respect to the axis of rotation of the pawl, the axis being transverse with relation to the correlated arm, the other arm having a slot provined therein on one side of the axis of rotation of the pawl and a projection on the opposite side of the axis of rotation of the pawl, the opposite ends of said slot and said projection providing abutments arranged in different positions of the first arm to be engaged by the pawl to limit endwise movement of one arm relative to the other toward coextensive telescoping relation and also releasably lock said arms in coextensive telescoping relation so as to support the lid in open position, said abutments being arranged to engage the teeth of the pawl and cause the pawl to turn progressively in one direction in reciprocatory movement of the arms relative to one another, the teeth of the pawl being V-shaped with the apexes of the V's projecting toward one another on diametrically opposite sides of the axis of rotation of the pawl.

5. A device of the character described, comprising an arm pivotally attached to a lid or other hinged member, another arm in telescoping relation with the first arm and pivotally attached to a receptacle or other support on which the lid is hinged, a pawl rotatably mounted on one of said arms and having at least two teeth in equally circumferentially spaced relation with respect to the axis of rotation of the pawl, the axis being transverse with relation to the correlated arm, the teeth of the pawl each having a V-shaped recess and the apexes of the V's projecting toward one another, thereby defining two prongs for each tooth, spaced abutments on the other arm arranged in different positions of the first arm relative thereto to be engaged by the pawl to limit endwise movement of one arm relative to the other toward coextensive telescoping relation and also releasably lock said arms in coextensive telescoping relation so as to support the lid in open position, one of said abutments comprising a slot provided in a wall of said arm spaced from the axis of rotation of the pawl a distance slightly less than the radius of a tooth of said pawl and adapted to have a tooth of said pawl engage in one end of said slot when supporting the lid in open position, whereby the pawl causes a binding frictional engagement of the slotted wall of the one arm with the adjacent wall of the other arm during the lid supporting operation, the abutments being arranged to engage the teeth of the pawl and cause the pawl to turn progressively in one direction in the reciprocatory movement of the arms relative to one another.

6. A device of the character described, comprising arms pivotally attached to a lid or other hinged member and to a receptacle or other support on which the lid is hinged, said arms being of channel-shaped cross-section, one of said arms having its side walls extending toward the web of the other arm and slidable between the side walls thereof so as to space the webs of the channels in substantially parallel relation, means for retaining said arms in telescoping relation, a pawl rotatably mounted on the web in the channel of one arm and enclosed in the channel of the other arm, the axis of rotation of said pawl being in transverse relation to the webs of both arms, said pawl having at least two teeth in equally circumferentially spaced relation with respect to the axis, the teeth of the pawl each having a V-shaped recess and the apexes of the V's projecting toward one another, thereby defining two prongs for each tooth, the side walls of said arms on one side of the axis having longitudinal slots provided therein arranged to come into register in the reciprocatory movement of the arms relative to one another, the slot in the side wall of the pawl-carrying arm being disposed in juxtaposition to the pawl to permit projection therethrough of the teeth of the pawl in the rotation of the latter, the slot in the other arm being arranged to have the ends thereof come into engagement with either tooth of the pawl in the reciprocatory movement of the arms relative to one another, and a projection on the web of the last named arm disposed on the opposite side of the axis of rotation of the pawl for engagement with another tooth of the pawl, said pawl being disposed with its axis of rotation spaced laterally with respect to the slotted wall of the other arm a distance less than the radial length of a tooth of said pawl, substantially as and for the purpose described.

7. A device of the character described, comprising arms pivotally attached to a lid or other hinged member and to a receptacle or other support on which the lid is hinged, said arms being of channel-shaped cross-section, one of said arms having its side walls extending toward the web of the other arm and slidable between the side walls thereof so as to space the webs of the channels in substantially parallel relation, means for retaining said arms in telescoping relation, a pawl rotatably mounted on the web in the channel of one arm and enclosed in the channel of the other arm, the axis of rotation of said pawl being in transverse relation to the webs of both arms, said pawl having two teeth in diametrically opposed relation with respect to the axis, the teeth of the pawl each having a V-shaped recess and the apexes of the V's projecting toward one another, thereby defining two prongs for each tooth, the side walls of said arms on one side of the axis having longitudinal slots provided therein arranged to come into register in the reciprocatory movement of the arms relative to one another, the slot in the side wall of the pawl-carrying arm being disposed in juxtaposition to the pawl to permit projection therethrough of the teeth of the pawl in the rotation of the latter, the slot in the other arm being arranged to have the ends thereof come into engagement with either tooth of the pawl in the reciprocatory movement of the arms relative to one another, and a projection on the web of the last named arm disposed on the opposite side of the axis of rotation of the pawl for engagement with the other tooth of the pawl, said pawl being disposed with its axis of rotation spaced laterally with respect to the slotted wall of the other arm a distance less than the radial length of either tooth of said pawl, substantially as and for the purpose described.

8. A device of the character described, comprising arms pivotally attached to a lid or other hinged member and to a receptacle or other support on which the lid is hinged, said arms being of channel-shaped cross-section, one of said arms having its side walls extending toward the web of the other arm and slidable between the side walls thereof so as to space the webs of the channels in substantially parallel relation, means for retaining said arms in telescoping relation, a pawl rotatably mounted on the web in the channel of one arm and enclosed in the channel of the other arm, the axis of rotation of said pawl being in transverse relation to the webs of both arms, said pawl having at least two teeth in equally circumferentially spaced relation with respect to the axis, the side walls of said arms on one side of the axis having longitudinal slots provided therein arranged to come into register in the reciprocatory movement of the arms relative to one another, the slot in the side wall of the pawl-carrying arm being disposed in juxtaposition to the pawl to permit projection therethrough of the teeth of the pawl in the rotation of the latter, the slot in the other arm being arranged to have the ends thereof come into engagement with either tooth of the pawl in the reciprocatory movement of the arms relative to one another, and a projection on the web of the last named arm disposed on the opposite side of the axis of rotation of the pawl for engagement with another tooth of the pawl, the teeth of the pawl being V-shaped with the apex of the V's projecting toward one another on diametrically opposite sides of the axis of rotation of the pawl.

9. A device of the character described, comprising arms pivotally attached to a lid or other hinged member and to a receptacle or other support on which the lid is hinged, said arms being of channel-shaped cross-section, one of said arms having its side walls extending toward the web of the other arm and slidable between the side walls thereof so as to space the webs of the channels in substantially parallel relation, means for retaining said arms in telescoping relation, a pawl rotatably mounted on the web in the channel of one arm and enclosed in the channel of the other arm, the axis of rotation of said pawl being in transverse relation to the webs of both arms, said pawl having at least two teeth in equally circumferentially spaced relation with respect to the axis, the side walls of said arms on one side of the axis having longitudinal slots provided therein arranged to come into register in the reciprocatory movement of the arms relative to one another, the slot in the side wall of the pawl-carrying arm being disposed in juxtaposition to the pawl to permit projection therethrough of the teeth of the pawl in the rotation of the latter, the slot in the other arm being arranged to have the ends thereof come into engagement with either tooth of the pawl in the reciprocatory movement of the arms relative to one another, and a projection on the web of the last named arm disposed on the opposite side of the axis of rotation of the pawl for engagement with another tooth of the pawl, the teeth of the pawl being V-shaped with the apex of the V's projecting toward one another on diametrically opposite sides of the axis of rotation of the pawl, one prong of one tooth of the pawl being longer than the other prong, and the corresponding prong on the other tooth being correspondingly longer than its companion prong.

10. A device as set forth in claim 4 wherein one prong of one tooth of the pawl is longer than the other prong, and the corresponding prong on the other tooth is correspondingly longer than its companion prong.

WALTER R. LUSTIG.